United States Patent
Beris et al.

(10) Patent No.: US 9,976,685 B2
(45) Date of Patent: May 22, 2018

(54) METHOD FOR FILLING A GAP IN THE COATING OF A PIPELINE COATED WITH A COATING, PREFERABLY A THERMO-INSULATING COATING

(71) Applicant: BLUEMARINE OFFSHORE YARD SERVICE B.V., Rotterdam (NL)

(72) Inventors: Petronella Francisca Maria Beris, Maasluis (NL); Kirill Gennadjevich Kavelin, Delfgauw (NL)

(73) Assignee: Bluemarine Offshore Yard Service B.V., Rotterdam (NL)

( * ) Notice: Subject to any disclaimer, the term of this patent is extended or adjusted under 35 U.S.C. 154(b) by 0 days. days.

(21) Appl. No.: 14/356,715

(22) PCT Filed: Nov. 7, 2012

(86) PCT No.: PCT/NL2012/050784
§ 371 (c)(1),
(2) Date: May 7, 2014

(87) PCT Pub. No.: WO2013/070074
PCT Pub. Date: May 16, 2013

(65) Prior Publication Data
US 2014/0311606 A1  Oct. 23, 2014

(30) Foreign Application Priority Data
Nov. 7, 2011 (NL) .................................. 2007737

(51) Int. Cl.
F16L 55/16 (2006.01)
F16L 55/18 (2006.01)
(Continued)

(52) U.S. Cl.
CPC ........ *F16L 55/18* (2013.01); *B29C 45/14622* (2013.01); *F16L 9/133* (2013.01);
(Continued)

(58) Field of Classification Search
CPC .................................. F16L 55/18; F16L 9/133
(Continued)

(56) References Cited

U.S. PATENT DOCUMENTS 3,865,662 A * 2/1975 Segal .............................. 156/94
4,673,122 A * 6/1987 Dubey .......................... 228/119
(Continued)

FOREIGN PATENT DOCUMENTS

EP        1504214 B1 *  8/2008
EP        2163800        3/2010
(Continued)

OTHER PUBLICATIONS

International Search Report for PCT Application No. PCT/NL2012/050784 dated Jan. 8, 2013.
(Continued)

*Primary Examiner* — Vishal Pancholi
(74) *Attorney, Agent, or Firm* — Meyertons, Hood, Kivlin & Goetzel, P.C.; Mark R. DeLuca

(57) ABSTRACT

The present invention relates to a method for filling a gap (13) in the coating (5) of a pipeline coated with a coating, in particular a thermo-insulating coating. The method according to the invention comprises the steps of placing in the gap (13) a mixture of solid elements and a thermoplastic polymeric material in fluid state, and letting the thermoplastic polymeric material in fluid state solidify.

24 Claims, 4 Drawing Sheets

(51) Int. Cl.
*F16L 58/18* (2006.01)
*F16L 59/20* (2006.01)
*F16L 13/02* (2006.01)
*B29C 45/14* (2006.01)
*F16L 9/133* (2006.01)

(52) U.S. Cl.
CPC ......... *F16L 13/0272* (2013.01); *F16L 58/181* (2013.01); *F16L 59/20* (2013.01)

(58) Field of Classification Search
USPC .................................................... 138/98, 99
See application file for complete search history.

(56) References Cited

U.S. PATENT DOCUMENTS

| | | | |
|---|---|---|---|
| 4,732,412 | A * | 3/1988 | van der Linden et al. ..... 285/47 |
| 5,489,405 | A | 2/1996 | Holbert et al. |
| 6,997,260 | B1 * | 2/2006 | Trader et al. ................. 166/277 |
| 2004/0176492 | A1 | 9/2004 | Brown |
| 2006/0118191 | A1 * | 6/2006 | Rice ................................ 138/99 |
| 2007/0107791 | A1 * | 5/2007 | Rice et al. ...................... 138/99 |
| 2009/0306246 | A1 | 12/2009 | Gervat et al. |

FOREIGN PATENT DOCUMENTS

| | | |
|---|---|---|
| EP | 2179830 | 4/2010 |
| FR | 2721681 | 12/1995 |
| JP | 10-043678 | 2/1998 |
| WO | 8600881 | 2/1986 |
| WO | 03/095887 | 11/2003 |

OTHER PUBLICATIONS

Written Opinion for PCT Application No. PCT/NL2012/050784 dated Jan. 8, 2013.
International Preliminary Report on Patentability for PCT Application No. PCT/NL2012/050784 dated May 13, 2014.

* cited by examiner

METHOD FOR FILLING A GAP IN THE COATING OF A PIPELINE COATED WITH A COATING, PREFERABLY A THERMO-INSULATING COATING

The present invention relates to a method for filling a gap in the coating of a pipeline coated with a coating, in particular a thermo-insulating coating.

Such methods are known in the field of laying steel pipelines offshore on the seabed for oil and gas applications.

The outside surface of the steel wall of such pipelines is in many cases coated with a thermo-insulating coating, for instance a polypropylene coating, which insulates the medium transported by means of the pipeline from outside thermal influences. By insulating the transported medium from outside thermal influences, variations along the length of the pipeline in viscosity of the transported medium as a result of variations along the length of the pipeline in the temperature of the water surrounding the pipeline are avoided, for example. Variations in the viscosity of the transported medium along the length of the pipeline have a negative influence on the throughput of the pipeline, and should therefore be avoided.

Such offshore pipelines are in general formed by butt-welding the ends of lengths of pipe coated with the thermo-insulating coating to one another on a pipe laying vessel, and subsequently lowering the thus formed pipeline towards the seabed. In order to be able to butt-weld the lengths of pipe to one another, the steel wall of each length of pipe is at each end thereof uncoated along a certain part of the length of pipe. This uncoated part of the lengths of pipe is referred to as a cut-back. After the ends of two lengths of pipe are placed against each other the respective ends are girth-welded. The uncoated parts of the lengths of pipe that are welded together form a gap in the thermo-insulating coating of the resulting pipeline. In order to provide a pipeline that is thermo-insulated along the length thereof, the gap is subsequently filled with a thermo-insulating material, in particular by filling the gap with a thermoplastic polymeric material in fluid state.

The goal of the present invention is to improve the known methods for filling a gap in the coating of a pipeline coated with a coating, in particular a thermo-insulating coating.

The method according to the invention comprises the steps of:
placing in the gap a mixture of solid elements and a thermoplastic polymeric material in fluid state; and
letting the thermoplastic polymeric material in fluid state solidify.

The method according to the invention makes it possible to provide within a particularly short period of time an infill, filling the gap, of which the outer surface is subjectable to mechanical loads without damaging the outer surface.

When filling the gap with thermoplastic polymeric material in fluid state, it takes time to let the material solidify such that the resulting infill filling the gap is subjectable to mechanical loads. To achieve a sufficient thermal insulation, a thermo-insulating coating is relatively thick compared to for instance anticorrosion coatings. Consequently, when filling a gap with the thermoplastic material in fluid state a relatively large volume of material will have to solidify before the infill is subjectable to mechanical loads without damage, resulting in a relatively long period of time before the infill is subjectable to mechanical loads without damage.

Especially when making a pipeline on a pipe laying ship, wherein the pipeline has to pass tensioners—which tension the pipeline while it is lowered toward the seabed—and roller boxes—which guide the pipeline towards the seabed—that both are brought into contact with the outer surface of the coating surrounding the pipeline, it is important to have an infill that is subjectable to mechanical loads without getting damaged in order to be able to finish the pipeline within the shortest possible period of time.

By placing according to the invention in the gap a mixture of solid elements and a thermoplastic polymeric material in fluid state, less volume of thermoplastic polymeric material in fluid state is required to fill the same gap volume relative to filling the complete volume of the gap with thermoplastic polymeric material in fluid state. As a result the time to solidify the thermoplastic polymeric material is shorter and the resulting infill is subjectable to mechanical loads within a shorter period of time. Furthermore, when the thermoplastic material in fluid state is brought into contact with the solid elements, heat is transferred from the thermoplastic material in fluid state to the relatively cold solid elements, such that the solidification of the thermoplastic material in fluid state is promoted, thus further shortening the period for solidifying the thermoplastic material in fluid state. Additionally, in the mixture of solid elements and the thermoplastic polymeric material in fluid state, solid elements that are in contact with each other allow for distribution of forces through the mixture even when the thermoplastic polymeric material in fluid state has not yet fully solidified. This further promotes the shortening of the period of time within which the resulting infill is subjectable to mechanical loads. The latter in particular applies when the solid elements are in contact with each other throughout the mixture.

Apart from thermo-insulating coatings, there are other coatings that need to be relatively thick compared to anti-corrosion coatings to be able to provide a sufficient effect, such as coatings for increasing or decreasing the buoyancy of a pipeline. The method according to the invention is also beneficial for filling a gap in such coatings. However, the method according to the invention is particularly beneficial for filling a gap in a thermo-insulating coating, as due to the relatively poor ability to transfer heat of the material with which the gap is to be filled, the period for solidifying the thermoplastic polymeric material which is dependent on the heat transfer rate is relatively long. Furthermore, the method according to the invention is in particular suitable for oil or gas pipelines operated at internal working temperatures above 100 degrees Celsius, since the thermoplastic polymeric material can particularly good withstand such temperatures without decomposing or degrading.

In the context of the present invention, the expression "in fluid state" with respect to the thermoplastic polymer material is to be understood as in liquid state, or in a soften state. A soften state is a state in which the thermoplastic polymer material is malleable, or deformable. In the context of the present invention, when the thermoplastic polymer material in fluid state solidifies, it is to be understood that the thermoplastic polymer material reversibly hardens (also designated as the thermoplastic polymer material being in solid state). The reversible physical transition from fluid state to the solidification, or hardening of the thermoplastic polymer material allows carrying out the method of the present invention with thereby filling a gap in the coating of a pipeline with a coating which does not comprise any crosslinked polymer material, or cured resin material. Accordingly, after carrying out the method according the present invention, the thermoplastic polymer material in fluid form that is solidified is a thermoplastic polymer material that is not crosslinked, thus not a 3D polymer. The thermoplastic polymer material is a linear polymer, or 2D polymer. Linear is to be understood as substituted or unsubstituted. Substitutions can be any functional organic group such as alcohol, halogens, or hydrocarbonrest such as alkyls or aryls. According to the present invention, a thermoplastic polymer material is a polymer material that becomes malleable, or moldable, or softened above a specific temperature, and returns to a solid state upon cooling (reversible). After the method according to the present invention, the properties of the thermoplastic polymer material are accordingly maintained: no modification of the intermolecular interactions is occurring in the present invention (modifications of intermolecular interactions namely occur, when a polymer undergoes a crosslinking, or curing, to result in a resin).

In the context of the present invention, a polymer material is to be understood as a material that is made of polymer comprising the repetition of monomers. It can be the same monomers providing a polymer material which is a homopolymer material, or the monomers may be different, providing a copolymer material. The homopolymer material and copolymer material in the context of the present invention are thermoplastic polymer materials.

In the context of the present invention, the thermoplastic polymeric material is brought in fluid state prior being placed in the gap in the coating of a pipeline. The fluid state is reached by heating the thermoplastic polymeric material so that the thermoplastic polymeric material does not decompose, or degrade.

In a preferred embodiment of the method according to the invention the solid elements comprise a polymeric material. When the hot thermoplastic material in fluid state is brought into contact with the solid elements comprising a polymeric material, heat is transferred from the thermoplastic material in fluid state to the relatively cold solid elements, causing the polymeric material comprised by the solid elements to soften or melt. The softening or melting of the polymeric material comprised by the solid elements promotes the amount of heat being transferred between the thermoplastic material in fluid state and the solid elements and the distribution of the heat over the volume of the mixture of the solid elements and the thermoplastic material in fluid state, resulting in a still further shortening of the period for solidifying the thermoplastic material in fluid state. Additionally, because of the softening or melting of the polymeric material comprised by the solid elements, the solid elements can become welded to each other, promoting the structural strength of the mixture of solid elements and thermoplastic material in fluid state. This makes it possible to subject the infill to mechanical loads sooner. Together with the shortening of the time required to solidify the thermoplastic material in fluid state, the latter results in a particular shortening of the period of time between filling of the gap and the infill being strong enough to be subjected to mechanical loads without damage.

In a preferred embodiment of the method according to the invention said polymeric material of the solid elements comprises a thermoplastic polymeric material. Accordingly, the polymeric material of the solid elements can consist of thermoplastic polymeric material (and eventual additives), or they can comprise a thermoplastic polymeric material and another polymer material that is not thermoplastic (as well as additives). The melting, or softening, of the thermoplastic material of the solid elements in particular promotes the heat transfer from the thermoplastic polymeric material in fluid state to the solid elements. In the preferred case wherein the surface of the solid elements comprises a thermoplastic polymeric material, the thermoplastic polymeric material of the solid elements will start to melt off the surface, which promotes the bonding between the solid elements, as well as the bonding between the solid elements and the thermoplastic polymeric material in fluid state. This bonding is in particular the result of the formation of entanglements of polymeric molecules of a solid element at the (partly) molten surface thereof with polymeric molecules of the thermoplastic polymeric material in fluid state or with polymeric molecules of another solid element at the (partly) molten surface thereof. Such a network of entangled molecules when cooled down becomes a bonded entity.

In a particularly advantageous development the solid elements consist of thermoplastic polymeric material. This makes it possible to make full use of the promoting of the amount of heat being transferred between the thermoplastic material in fluid state and the solid elements and the distribution of the heat over the volume of the mixture of the solid elements and the thermoplastic material in fluid state by melting the thermoplastic polymeric material comprised by the solid elements. Alternatively the solid elements have a shell of thermoplastic material around a core of another material, or are made of a mixture of thermoplastic polymeric material and another material. The shell can be made of a thermoplastic polymer material (homopolymers or copolymer) such as defined in the present invention. The shell may be as well a foam of thermoplastic polymer material. The other material could for instance be a material increasing or decreasing the buoyancy of the resulting infill. In a further alternative embodiment said polymeric material of the solid elements is a thermosetting polymeric material, such as a polyurethane resin, a polyester resin, epoxy resin, a polyimide resin, a polycyanurate resin or even glass. In the context of the present invention, the thermosetting polymeric material is a resin, already crosslinked or that crosslinks with the heat transfer of the thermoplastic polymer material in fluid state. In the context of the present invention, the thermosetting material accordingly underwent a crosslinking process. Since thermosetting polymeric material does not melt when heated, the application of thermosetting polymeric material in the solid elements promotes the structural strength of the mixture of solid elements and the thermoplastic polymeric material in fluid state during the solidification thereof. Of course the temperature of the thermoplastic polymeric material in fluid state then should be such that the thermosetting polymeric material does not decompose, or degrade.

According to a preferred advantageous further development of the method according to the invention with solid elements comprising or even consisting of a thermoplastic material, the thermoplastic material of the solid elements is the same as said thermoplastic material in fluid state. This allows for a particular good bonding between the thermoplastic material of the solid elements and the thermoplastic material in fluid state brought into contact with the solid elements. In combination with solid elements consisting of a thermoplastic material this results in a particularly homogeneous structure of the resulting infill, which is of particular importance when the coating including the infill is a thermo-insulating coating. Alternatively the thermoplastic polymeric material of the solid elements is different from the thermoplastic polymeric material in fluid state. For instance it could be beneficial to combine solid elements made of a thermoplastic polymeric material with particularly good insulating properties with a thermoplastic polymeric material in fluid state made of a material with particularly good adhesive properties.

In an advantageous embodiment of the method according to the invention the step of placing in the gap a mixture of solid elements and a thermoplastic material in fluid state comprises:
- surrounding the gap by means of a mould;
- introducing in the mould the solid elements; and
- injecting into the mould the thermoplastic polymeric material in fluid state after introducing in the mould the solid elements. This allows for a convenient placing in the gap a mixture of solid elements and a thermoplastic material in fluid state and for control over the distribution of the solid elements over the volume to be filled. After sufficient solidification of the fluid material in fluid state the mould is removed.

According to an advantageous development of the method according to the invention wherein the thermoplastic material in fluid state is injected into the mould after introducing in the mould the solid elements, the method further comprises the step of pre-bonding the solid elements by heating the solid elements before introducing the thermoplastic material in fluid state into the mould, for instance by means of hot air or a flame. This makes it possible to improve the bond strength between the solid elements. Preferably the solid elements are heated after introducing the solid elements into the mould. Additionally the pre-bonding is further improved by compacting the solid elements in the mould during or after the heating thereof. Typically, vibrations can be applied to the solid elements or hot air can be used to assist the compacting step.

In a further advantageous embodiment of the method according to the invention wherein the thermoplastic material in fluid state is injected into the mould after introducing in the mould the solid elements, the solid elements are designed to form a stack of solid elements once introduced into the mould wherein there are interconnected spaces between the solid elements throughout the stack that are configured to be filled with the thermoplastic material in fluid state once the thermoplastic material is introduced into the mould. This makes it possible to promote and control the mixing of the solid elements and the thermoplastic material in fluid state when the thermoplastic material in fluid state is injected into the mould.

In an advantageous alternative embodiment of the method according to the invention wherein the thermoplastic material in fluid state is injected into the mould after injecting in the mould the solid elements, the step of placing in the gap a mixture of solid elements and a thermoplastic material in fluid state comprises:
- surrounding the gap by means of a mould;
- introducing into the mould the solid elements; and
- injecting into the mould the thermoplastic material in fluid state simultaneous with introducing in the mould the solid elements.

This allows for an alternative way to promote and control the mixing of the solid elements and the thermoplastic material in fluid state.

According to an advantageous further development thereof the solid elements are added to the thermoplastic material in fluid state before being introduced into the mould. This allows for more control over the mixing of the solid elements and the thermoplastic material in fluid state.

According to an advantageous development of the method according to the invention wherein the thermoplastic material in fluid state is introduced into the mould after or simultaneously with introducing in the mould the solid elements a mixture of solid elements of different sizes and/or shapes is introduced into the mould. This allows for control over the volume of the interconnected spaces between the solid elements to be filled with the thermoplastic material in fluid state.

In an advantageous alternative embodiment of the method according to the invention wherein the thermoplastic polymeric material in fluid state is injected into the mould after or simultaneous with introducing in the mould the solid elements, the method comprises the steps of:
- placing the solid elements in the gap;
- surrounding the gap by means of the mould after placing the solid elements in the gap; and
- injecting into the mould the thermoplastic material in fluid state.

This allows for an alternative way to promote and control the mixing of the solid elements and the thermoplastic material in fluid state, and additionally allows for a particular control over the distribution of the solid particles over the volume of the gap.

According to an advantageous embodiment thereof, the solid elements are pre-bonded into a pre-form such that there are interconnected spaces between the bonded solid elements throughout the pre-form that are configured to be filled with the thermoplastic material in fluid state once the thermoplastic material is injected into the mould. This allows promoting and controlling the mixing of the solid elements and the thermoplastic material in fluid state. The pre-form for instance has the shape of a part of the volume to be filled, such as a half shell shape. Alternatively, the solid elements each have the shape of a part of the volume to be filled.

According to a further advantageous development of the method according to the invention the solid elements are provided with an adhesion promoter. This allows for improving the bond strength of the bond between the solid elements and/or adhesion between the material of the solid elements and the thermoplastic material in fluid state, depending on the type of promoter that is provided. Preferably the surface of the solid elements is provided with the adhesion promoter. Further the adhesion promoter is preferably a heat activable adhesion promoter. The promoter can be a different polymeric material or consist of exothermic chemicals, i.e. chemicals that generate heat after the activation thereof. In an alternative embodiment, in order to improve the adhesion, the solid elements are surface treated, for example by plasma or corona treatment. Further it is alternatively possible to mechanically treat the surface of the solid elements to improve the adhesion.

According to a further advantageous development of the method according to the invention the mixture of the solid elements and the thermoplastic material in fluid state contains 30 vol-% to 98 vol-%, such as 30, 35, 40, 45, 50, 55, 60, 65, 70, 75, 80, 85, 90, 95, 98 vol-%; preferably 70 vol-% to 95 vol-%, such as 70, 74, 78, 82, 86, 90, 94, 95 vol-%, more preferably 80 vol-% to 92 vol-%, such as 80, 82, 84, 86, 88, 90, 92 vol-% solid elements.

According to a further advantageous development of the method according to the invention the solid elements have the form of balls, rods, or blocks.

The method according to the invention particularly reduces the time for solidifying the thermoplastic material in fluid state in case of coatings of great thicknesses, such as coatings having thickness of more than 5 mm, in particular more than 10 mm, such as 10, 20, 40, 60, 80, 100, 120, 140, 150, 200, 250 mm.

According to a further advantageous development of the method according to the invention the solid elements each have a size along any line intersecting the solid elements comprised between 10 and 100 mm, such as 10, 20, 30, 40, 60, 70, 80, 90, 100 mm. Such sizes are particularly beneficial for filling a gap of a coating having thickness of more than 10 mm.

In a further advantageous development of the method according to the invention the thermoplastic material in fluid state is injected into the mould by injection moulding. This provides for an effective way of introducing the thermoplastic material in fluid state into the mould. In an advantageous development thereof the injection moulding is provided by means of a barrel containing a screw, preferably by means of an accumulator connected to the barrel and to the mould. Injection moulding is a particularly advantageous process in the context of the present invention, because the material used in the present method is a thermoplastic polymer material (that is to be in fluid state and then solidified). Other polymer material, such as thermosetting polymer resin (i.e. polyurethane resins), not suitable for the method according to the present invention, are also not suitable for injection moulding.

In an advantageous embodiment of the method according to the invention wherein the solid elements are added to the thermoplastic material in fluid state before being introduced into the mould and wherein the thermoplastic material in fluid state is introduced into the mould by injection moulding by means of a barrel containing a screw or by an accumulator connected to the barrel, the solid elements are added to the thermoplastic polymeric material in fluid state between the barrel and the mould. This allows that the solid elements are added to the thermoplastic material in fluid state directly before the introduction of the solid elements and the thermoplastic material in fluid state into the mould in such a way that it is avoided that the solid elements melt completely before being introduced into the mould.

According to an advantageous further development of the method according to the invention the thermoplastic material of the solid elements and/or the thermoplastic material in fluid form is selected from the group consisting of homopolymers of polypropylene (PP), polyethylene (PE), polyethylene terephtalate (PET), polyvinyl halide (such as polyvinyl fluoride (PVF), polyvinyl difluoride (PVDF), polyvinyl chloride (PVC), polyvinyl dichloride (PVDC), polytetrafluoroethylene (PTFE)), polyvinyl acetate (PVA), polyacrylonitrile butadiene styrene (ABS). The thermoplastic polymer materials can be selected from the group consisting of copolymers of polypropylene (PP), polyethylene (PE), polyethylene terephtalate (PET), polyvinyl halide (such as polyvinyl fluoride (PVF), polyvinyl difluoride (PVDF), polyvinyl chloride (PVC), polyvinyl dichloride (PVDC)), polyvinyl acetate (PVA), polyvinyl chloride (PVC), polyvinyl dichloride (PVDC), polytetrafluoroethylene (PTFE)), polyvinyl actetate (PVA), polyacrylonitrile butadiene styrene (ABS), with any thermoplastic polymer material, such as polypropylene (PP), polyethylene (PE), polyethylene terephtalate (PET), polyvinyl halides (such as polyvinyl fluoride (PVF), polyvinyl difluoride (PVDF), polyvinyl chloride (PVC), polyvinyl dichloride (PVDC), polychlorotrifluoroethylene (PCTFE)), polyvinyl actetate (PVA), polyvinyl chloride (PVC), polyvinyl dichloride (PVDC), polytetrafluoroethylene (PTFE)), polyvinyl actetate (PVA), polyacrylonitrile butadiene styrene (ABS), polystyrene (PS).

Advantageously, the thermoplastic polymer material is a homopolymers or a copolymer of polypropylene or polyethylene. The use of polypropylene or polyethylene allows for relatively low material costs in combination with relatively good thermo-insulation.

According to an advantageous development of the method according to the invention the solid elements are cooled before injecting the thermoplastic polymeric material in fluid form into the mould, preferably before being introduced into the mould. This has the effect that the thermoplastic material in fluid state can solidify in a shorter time. This development is advantageously combined with the development of pre-bonding the solid elements by heating, wherein preferably the solid elements are cooled before pre-bonding the solid elements. In the latter case preferably the surface of cooled solid elements is heated such that it melts while the core of the solid elements remains relatively cold, resulting in a good bonding between the solid elements and subsequently a particularly good cooling of the thermoplastic material in fluid state.

The present invention is further related to a method for field joint coating comprising the steps of
providing two lengths of pipe coated with a coating, preferably a thermo-insulating coating, wherein at least one end of each length of pipe is uncoated along a certain part of the length of pipe;
placing the uncoated ends against each other;
applying a girth weld to join said ends to form a pipeline coated with a coating and with a gap in said coating surrounding the girth weld; and
filling said gap by means of the steps of the method according to the invention as described herein above.

As the lengths of pipe are joined in the field, i.e. on the location where the pipeline is being laid, the process of coating of the joints, i.e. girth-welds, is called field joint coating.

In a preferred embodiment thereof the coating of said two lengths of pipe comprises a thermoplastic polymeric material. This makes it possible to achieve that the coating of the pipeline which comes into contact with the thermoplastic material in fluid state melts or softens, such that the bonding between the coating of the lengths of pipe and the resulting infill is improved. In a further preferred embodiment the thermoplastic polymeric material in fluid state that is placed in the gap is the same thermoplastic polymeric material as thermoplastic polymeric material of the coating. By "same thermoplastic polymer material" is to be understood a homopolymer or a copolymer of the same thermoplastic polymer material. This embodiment allows for a particularly good bonding, and makes it possible to achieve that the coating of the resulting pipeline is more uniform along the length thereof. The latter result is in particular achieved in case the coating of the lengths of pipe consists of a thermoplastic polymeric material, and the thermoplastic polymeric material in fluid state and the thermoplastic polymeric material of the solid elements are the same thermoplastic polymer material as the thermoplastic polymer material of the coating of the lengths of pipe. Again, by "same thermoplastic polymer material" is to be understood a homopolymer or a copolymer of the same thermoplastic polymer material.

The present invention is further related to a pipeline coated by means of the method according to the invention as described herein above.

The present invention is further related to a pipeline coated with a coating, preferably a thermo-insulating coating, comprising a gap in said coating filled by a mixture of solid elements, preferably comprising a polymeric material, more preferably a thermoplastic polymeric material, and a thermoplastic polymeric material in fluid state.

The present invention is further related to a kit of parts for performing the method according to the invention as described herein above wherein the thermoplastic material in fluid state is injected in a mould surrounding the gap, said kit comprising:
  a mould configured to surround the gap in the coating of the pipeline coated with a coating;
  solid elements configured to be introduced into the mould preferably comprising a polymeric material, more preferably a thermoplastic polymeric material;
  a device configured to melt thermoplastic material into fluid state and to introduce said thermoplastic polymeric material in fluid state into the mould; and
  thermoplastic polymeric material adapted to be melted into fluid state and to be introduced in fluid state into the mould by means of said device.

The present invention is further elucidated in the following description with reference to the accompanying schematic figures.

In the figures the method for filling a gap in the coating of a pipeline coated with a thermo-insulating coating according to the invention is shown as part of a method for field joint coating.

Figure 1:
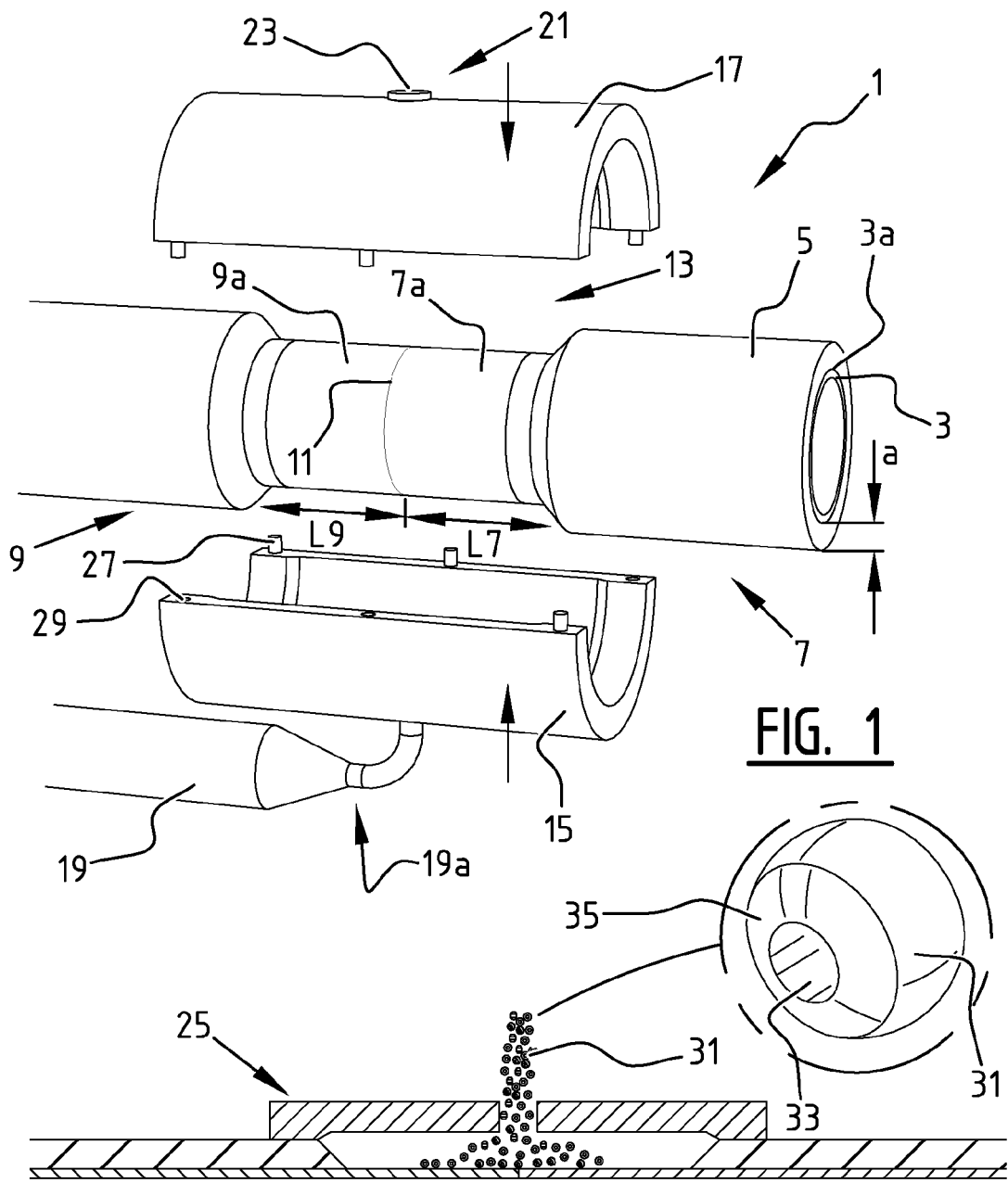
FIGS. 1 to 6 show the method for filling a gap in the coating of a pipeline coated with a thermo-insulating coating according to the invention in either a perspective view or a cross-sectional side view.

FIG. 1 shows a ferromagnetic pipeline 1 having a steel wall 3. The outside surface 3a of the steel wall of the pipeline is coated with a thermo-insulating coating 5 made of polypropylene. The pipeline 1 is formed by butt-welding the end 7a of a first length of pipe 7 to the end 9a of a second length of pipe 9 by means of a circumjacent girth-weld 11. Each length of pipe 7, 9 is at the respective end 7a, 9a thereof uncoated along a certain part L7, L9 of the length of pipe 7, 9, such that a so-called cut back results. The uncoated ends 7a, 9a form a gap 13 in the thermo-insulating coating 5. The thickness a of the coating as shown in FIG. 1 is about 150 mm.

In FIG. 1 are further shown two half shells 15 and 17. One shell 15 is connected to the end 19a of a barrel 19 of an injection moulding device. The other shell 17 is provided with a hole 21 in which a plug 23 is arranged.

According to the invention a mixture of solid elements and a thermoplastic material in fluid state is placed in the gap 13 in a number of steps.

According to a first embodiment of the method according to the invention in a first step the half shells 15 and 17 are arranged over de gap 13 in the direction of arrows A, such that the half shells 15, 17 form a mould 25 surrounding the gap 13. The half shells 15, 17 are provided with positioning pins 27 and positioning holes 29 to help aligning the half shells with respect to one another.

Figure 2:
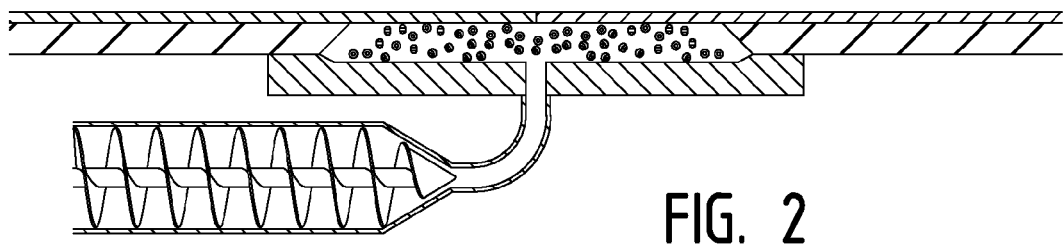

Subsequently, as shown in FIG. 2, solid elements 31 are introduced in the mould 25 through the hole 21. As shown in the detailed view of one of the solid elements 31, the solid element has the form of a ball with a through-hole 33, and flattened parts 35 on opposite sides thereof. However, in an alternative advantageous embodiment the solid elements do not have a through-hole 33. The solid elements 31 comprise or consist of polymeric material such as a thermoplastic material, in particular polypropylene.

Figure 3:
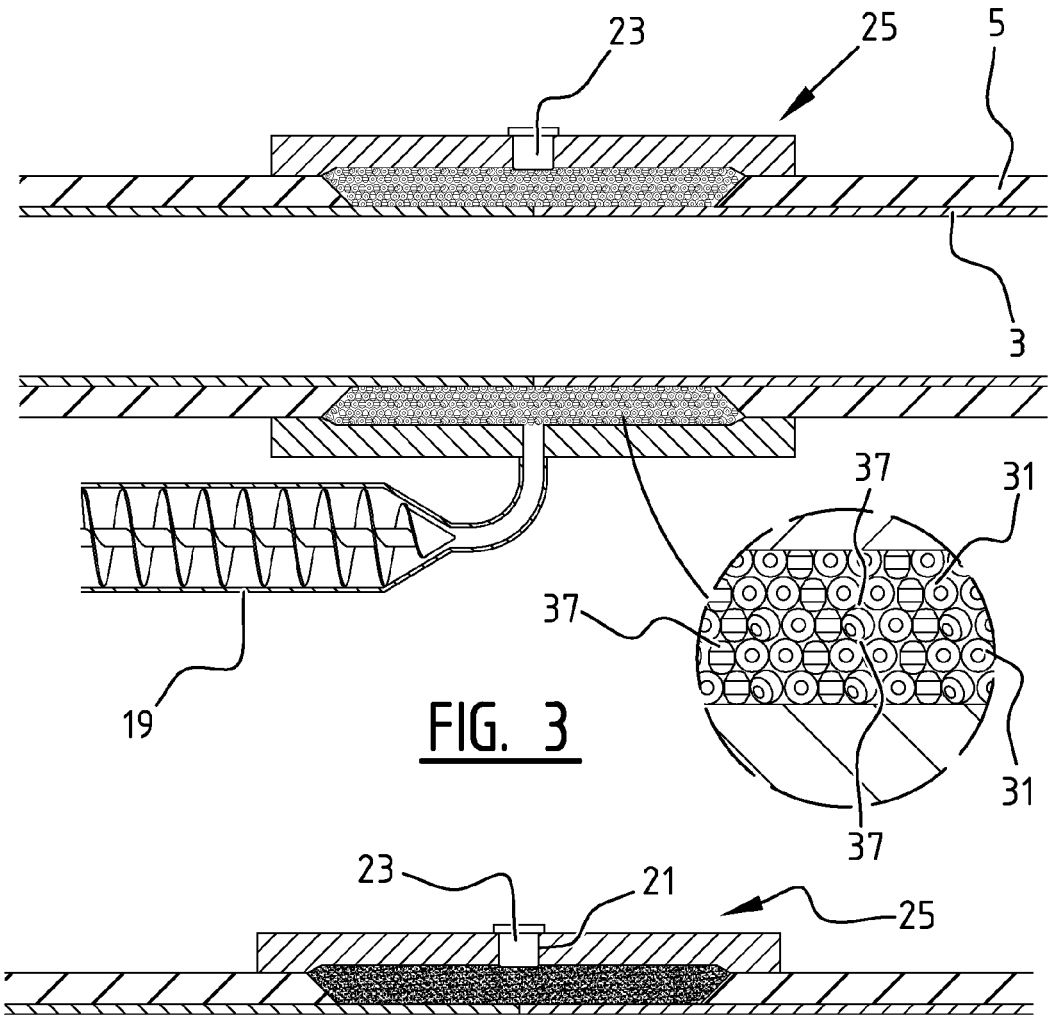

As shown in FIG. 3 as a result of the form and size of the solid elements 31, the solid elements 31 form a stack of solid elements once introduced into the mould 25, wherein there are interconnected spaces 37 between the solid elements throughout the stack. In FIG. 3 is shown that the interconnected spaces 37 have a volume of about 20% of the volume to be filled, such that already 80% of the volume to be filled is solid material. However, the already filled volume could be up to 92% of the volume to be filled. The solid elements 31 are in contact with each other, such that forces may be distributed over the solid elements 31. In particular forces exerted on the solid elements 31 positioned farthest away from the wall of the pipeline directed in the direction of the wall, may be distributed to the wall via the solid elements positioned in between.

Before performing the next step of introducing into the mould 25 thermoplastic material in fluid state, optionally the step is performed of pre-bonding the solid elements 31 by heating the solid elements 31, for instance by means of hot air or a flame, such that the surfaces of the solid elements 31 start to melt and are welded together. Further optionally the step is performed of compacting the solid elements 31 in the mould, for instance by vibrating the solid elements 31.

Figure 4:
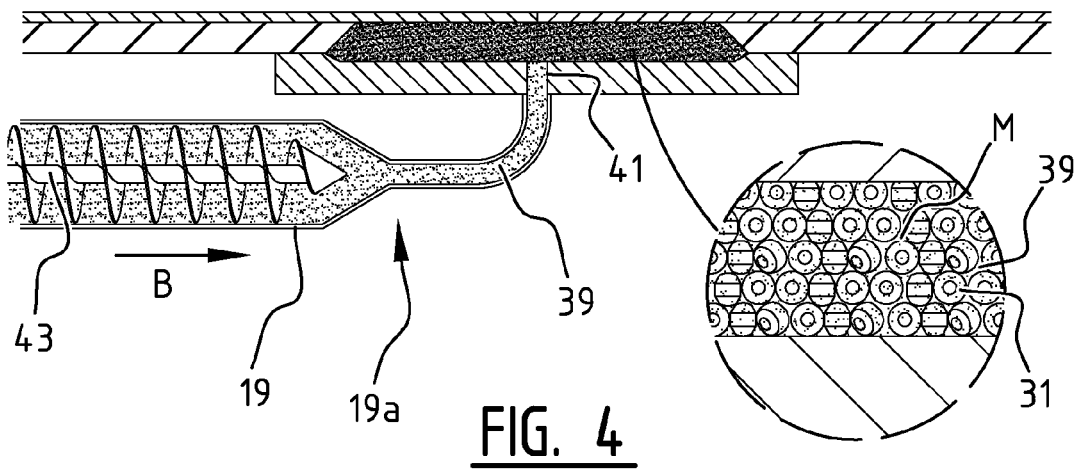

Subsequently the plug 23 is arranged in the hole 21 and the step is performed of introducing into the mould 25 thermoplastic material, in particular polypropylene, in fluid state. As shown in FIG. 4 thermoplastic material 39 in fluid state is introduced into the mould 25 by injecting thermoplastic material 39—that was melted into fluid state in the injection moulding device which comprises barrel 19—through the injection hole 41 in the mould 25 that is connected to the end 19a of the barrel 19 by moving the screw 43 located in the barrel 19 in the direction of arrow B. The thermoplastic material in fluid state is then forced through the interconnected spaces 35 between the solid elements 31 until the volume of the interconnected spaces 35 between the solid elements 31 is filled with the thermoplastic material 39 in fluid state. Alternatively, a so-called accumulator is arranged between the barrel 19 and the mould 25, which accumulator is fed by the barrel comprising the screw with the thermoplastic polymeric material in fluid state and which accumulator comprises a piston for injecting the material in fluid state into the mould. Instead of one injection point, multiple injection points can be used, such that the injection time can be further reduced. The plug 23 is provided with venting holes such that the air that is forced out of the interconnecting spaces 35 is forced out of the mould 25. However, venting holes may also be provided on other locations.

When the relative hot thermoplastic material 39 in fluid state, for instance having a temperature of 200-250 degrees Celsius, is brought into contact with the relatively cold solid elements 31, the thermoplastic material 39 in fluid state starts to cool and consequently solidifies, while the surface of the solid elements 31 is heated and consequently softens or melts. This results in a mixture M as shown in the detailed view to FIG. 4 of softened or partly melted solid elements 31 and partly solidified thermoplastic material 39.

Figure 5:
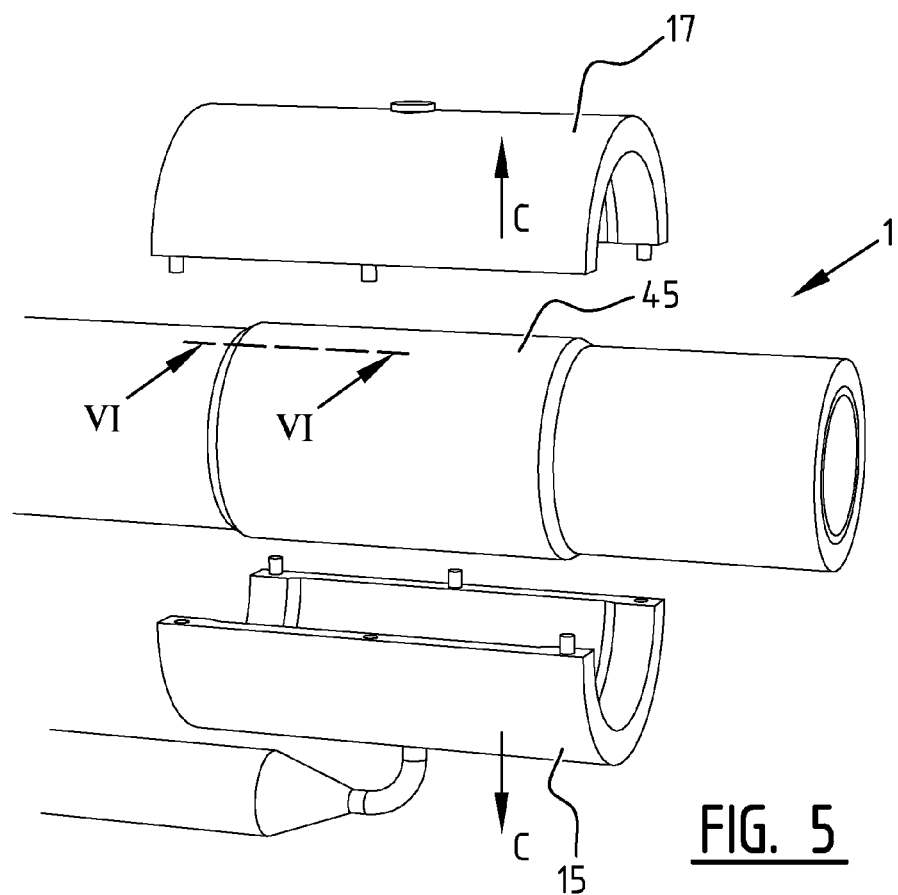

After letting the thermoplastic material in the mould 25 solidify to a certain extend the mould 23 is removed, as shown in FIG. 5, by moving the half shells 15, 17 in the direction of arrows C away from the resulting infill 45.

Figure 6:
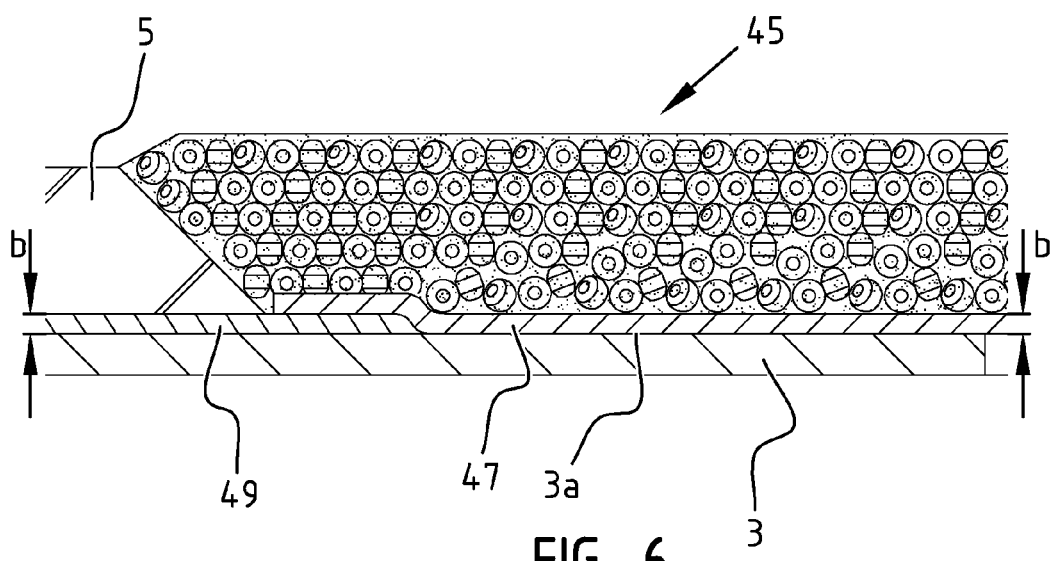

As shown in FIG. 6, after full solidification of the thermoplastic material of the infill 45, partly melted solid elements 31 could still be recognisable in the material of the infill 45.

It is also shown in FIG. 6 that an anti-corrosion coating 47, 49, or coating improving the adhesion between the outside surface 3a of steel wall 3 and the thermo-insulating coating 5, is provided between the outside surface 3a of steel wall 3 and the thermo-insulating coating 5 before coating the outside surface 3a of the steel wall 3 and before placing the mixture of solid elements 31 and thermoplastic material 39 in fluid state into the gap 13. The coating 47, 49 has a thickness b of about 500 µm.

Figure 7:
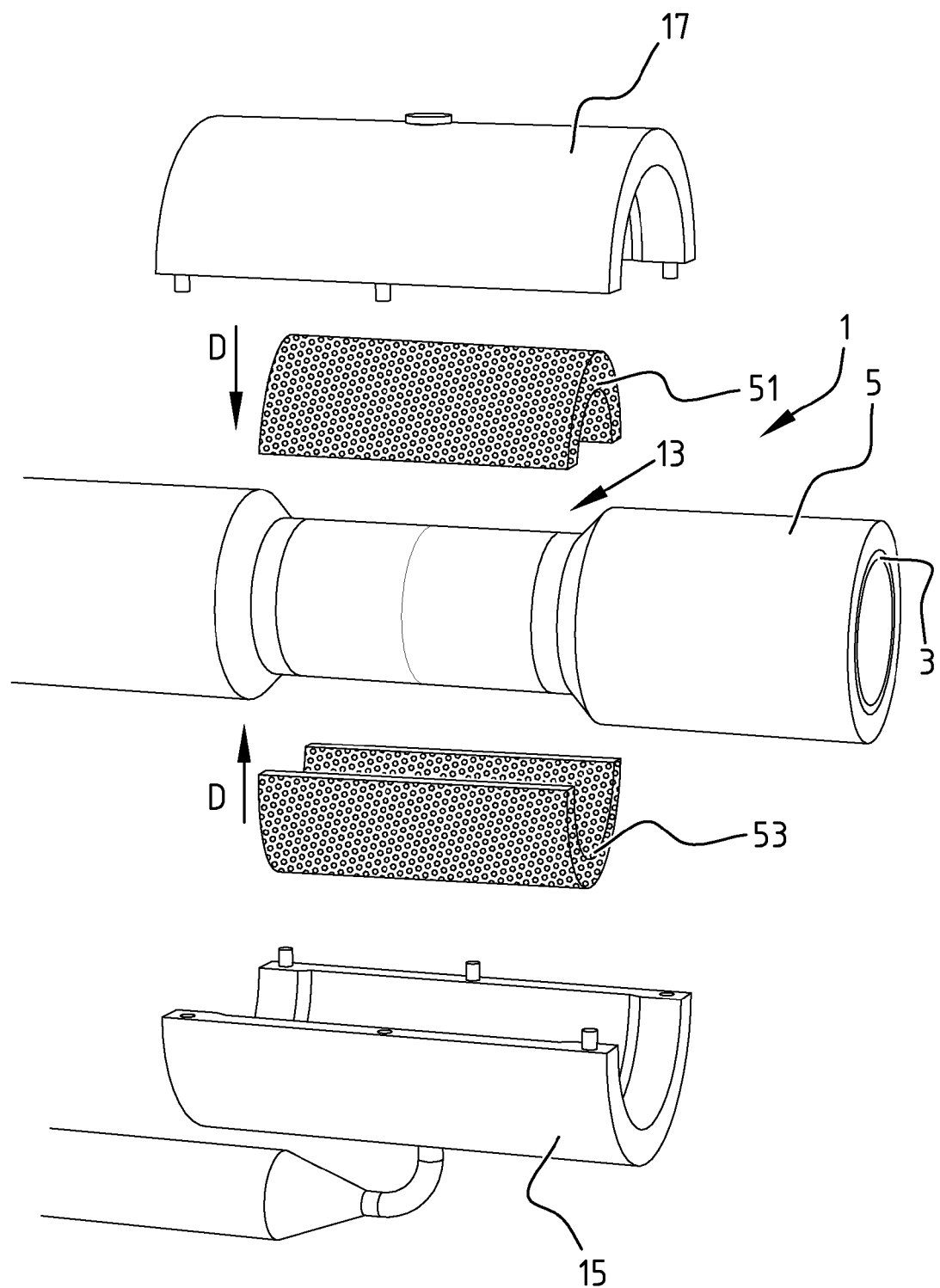
FIG. 7 shows a further alternative embodiment of the method according to the invention relative to the method as shown in FIGS. 1 to 6.

In FIG. 7 a further alternative embodiment of the method according to the invention as shown in FIGS. 1 to 6 is shown. Instead of surrounding the gap by means of a mould 25 before introducing into the mould 25 the solid elements 31, the solid elements are placed in the gap pre-bonded into two pre-forms 51, 53 in the direction of arrows D before surrounding the gap by means of the mould 25. After surrounding the gap by means of the mould 25 by arranging the half shells 15, 17 around the gap 13, the thermoplastic material 39 in fluid state is introduced into the mould 25. In the pre-forms 51, 53 the solid elements are pre-bonded such that there are interconnected spaces between the bonded solid element throughout the pre-form that are configured to be filled with the thermoplastic material in fluid state once the thermoplastic material 39 is injected into the mould 25. Alternatively it is possible that the pre-forms 51, 53 are solid throughout the pre-form, and thus each represents one solid element. In the latter case a mixture of two solid elements is placed into the gap.

Although in FIG. 7 two pre-forms are shown each in the shape of a half shell, more pre-forms may be used to pre-fill the gap.

Apart from the shown embodiments of the method according to the invention it is also possible to introduce the thermoplastic material 39 in fluid state and the solid elements 31 into the mould simultaneously. In that case the solid elements are for instance added to the thermoplastic material in fluid state between the end 19a of the barrel 19 and the injection hole 41. In case an accumulator is provided between the barrel 19 and the injection hole 41, the solid elements are for added to the thermoplastic polymeric material in fluid state in the accumulator directly before injecting the thermoplastic polymeric material in fluid state into the mould, such that the solid elements do not melt or melt only partially before entering the mould.

Furthermore, it is alternatively also possible to place the mixture of solid elements and thermoplastic material in fluid state in the gap before or even without surrounding the gap by means of a mould. However this is only possible when the mixture is sufficiently cohesive.

The mould as applied in the method according to the invention is in an advantageous further development additionally provided with cooling means for forced cooling of the mould, allowing for promoting the extraction of heat from the material inside the mould.

Furthermore, the mould as applied in the method according to the invention is in an advantageous further development additionally provided with vacuum means for promoting the extraction of air from the inside of the mould. This helps the thermoplastic material in fluid state to enter the interconnecting spaces in between the solid elements.

Before injecting the thermoplastic polymeric material into the mould, it is possible to cool or heat the solid elements. It is also possible to first heat the surface of the solid elements to enhance bonding of the solid elements to each other and subsequently cool the solid elements to promote the heat transfer between the thermoplastic material in fluid state and the solid elements. Alternatively first the solid elements are cooled, and subsequently the surface thereof is heated.

It is further advantageous to heat the chamfers of the coating 5 of the pipe-line 1 to enhance adhesion between the coating 5 and the material filling the gap 13.

Although in the figures it is shown that a circumferential gap is filled, also gaps with another form may advantageously be filled by means of the method according to the invention.

The invention claimed is:

1. Method for field joint coating, comprising:
   providing two lengths of pipe coated with a coating, wherein at least one end of each length of pipe is uncoated along a certain part of the length of pipe;
   placing the uncoated ends against each other;
   applying a girth weld to join said ends to form a pipeline coated with a coating and with a gap in said coating surrounding the girth weld; and
   filling said gap by:
      placing in the gap a mixture of solid elements and a heated thermoplastic polymeric material in fluid state; and
      letting the heated thermoplastic polymeric material in fluid state solidify;
   wherein the coating of said two lengths of pipe comprises a thermoplastic polymeric material.

2. The method according to claim 1, wherein the solid elements comprise a polymeric material.

3. The method according to claim 2, wherein said polymeric material of the solid elements is a thermoplastic polymeric material.

4. The method according to claim 3, wherein the thermoplastic polymeric material of the solid elements is the same as said thermoplastic polymeric material in fluid state.

5. The method according to claim 1, wherein placing in the gap a mixture of solid elements and a thermoplastic polymeric material in fluid state comprises:
   surrounding the gap by means of a mold;
   introducing in the mold the solid elements after surrounding the gap with the mold; and
   injecting into the mold the heated thermoplastic polymeric material in fluid state after introducing in the mold the solid elements.

6. The method according to claim 5, further comprising pre-bonding the solid elements by heating the solid elements before introducing the heated thermoplastic polymeric material in fluid state into the mold, wherein the solid elements are heated after introducing the solid elements into the mold.

7. The method according to claim 5, further comprising compacting the solid elements in the mold.

8. The method according to claim 5, wherein the solid elements are designed to form a stack of solid elements once introduced into the mold wherein there are interconnected spaces between the solid elements throughout the stack that are configured to be filled with the heated thermoplastic polymeric material in fluid state once the heated thermoplastic polymeric material is introduced into the mold.

9. The method according to claim 1, wherein placing in the gap a mixture of solid elements and a heated thermoplastic polymeric material in fluid state comprises:
   surrounding the gap by means of a mold; and
   injecting into the mold the heated thermoplastic polymeric material in fluid state simultaneous with introducing in the mold the solid elements;
   wherein
      the solid elements are added to the heated thermoplastic polymeric material in fluid state before being introduced into the mold.

10. The method according to claim 5, wherein a mixture of solid elements of different sizes and/or shapes is introduced into the mold.

11. Method according to claim 1, comprising:
placing the solid elements in the gap;
surrounding the gap by means of the mold after placing the solid elements in the gap; and
injecting into the mold the heated thermoplastic polymeric material in fluid state,
wherein
the solid elements are pre-bonded into a pre-form, and wherein
in the pre-form the solid elements are pre-bonded such that there are interconnected spaces between the bonded solid element throughout the pre-form that are configured to be filled with the heated thermoplastic polymeric material in fluid state once the heated thermoplastic polymeric material is injected into the mold.

12. The method according to claim 1, wherein
the solid elements comprise an adhesion promoter or wherein
the solid elements have been surface treated to promote adhesion.

13. The method according to claim 1, wherein the mixture of the solid elements and the thermoplastic material in fluid state contains 30 vol % to 98 vol % solid elements.

14. The method according to claim 1, wherein the solid elements have the form of balls or rods.

15. The method according to claim 1, wherein the solid elements each have a size along any line intersecting the solid elements comprised between 10 and 100 mm.

16. The method according to claim 1, wherein the coating of the pipeline has a thickness of more than 5 mm.

17. The method according to claim 5, wherein the heated thermoplastic polymeric material in fluid state is injected into the mold by means of a barrel containing a screw.

18. The method according to claim 9, wherein the solid elements are added to the heated thermoplastic polymeric material in fluid state between the barrel and mold.

19. The method according to claim 1, wherein the polymeric material of the solid elements and/or the thermoplastic polymeric material in fluid form comprises a polymer selected from the group consisting of: polypropylene (PP), polyethylene (PE), polyethylene terephtalate (PET), polyvinyl halide, polyvinyl difluoride (PVDF), polyvinyl chloride (PVC), polyvinyl dichloride (PVDC), polytetrafluoroethylene (PTFE)), polyvinyl actetate (PVA), and polyacrylonitrile butadiene styrene (ABS).

20. The method according to claim 1, wherein the polymeric material of the solid elements and/or the heated thermoplastic polymeric material in fluid form is a homopolymer or a copolymer.

21. The method according to claim 5, wherein the solid elements are cooled before injecting the heated thermoplastic polymeric material in fluid state into the mold, wherein the solid elements are cooled to a temperature sufficient to promote heat transfer between the solid elements and the heated thermoplastic polymeric material in fluid state.

22. The method according to claim 6, wherein the solid elements are cooled before pre-bonding the solid elements.

23. The method according to claim 1, wherein the heated thermoplastic polymeric material in fluid state that is placed in the gap is the same thermoplastic polymeric material as thermoplastic polymeric material of the coating of said two lengths of pipe.

24. The method according to claim 1, wherein the solid elements have the form of blocks.

* * * * *